United States Patent
Renwick et al.

(10) Patent No.: US 12,196,543 B2
(45) Date of Patent: Jan. 14, 2025

(54) SYSTEM FOR IN-PROCESS INSPECTION OF FUSED-FILAMENT FABRICATED PARTS AND ASSOCIATED METHODS

(71) Applicant: The Boeing Company, Chicago, IL (US)

(72) Inventors: Zachary Renwick, St. Louis, MO (US); Joseph Costanzo, Mukilteo, WA (US); Jennifer Creamer, St. Louis, MO (US)

(73) Assignee: The Boeing Company, Arlington, VA (US)

( * ) Notice: Subject to any disclaimer, the term of this patent is extended or adjusted under 35 U.S.C. 154(b) by 321 days.

(21) Appl. No.: 17/714,876

(22) Filed: Apr. 6, 2022

(65) Prior Publication Data

US 2023/0324170 A1 Oct. 12, 2023

(51) Int. Cl.
| | |
|---|---|
| G01B 11/24 | (2006.01) |
| B29C 64/118 | (2017.01) |
| B29C 64/25 | (2017.01) |
| B29C 64/386 | (2017.01) |
| B33Y 10/00 | (2015.01) |
| B33Y 30/00 | (2015.01) |
| B33Y 50/00 | (2015.01) |
| G01B 11/25 | (2006.01) |

(52) U.S. Cl.
CPC ........ *G01B 11/2518* (2013.01); *B29C 64/118* (2017.08); *B29C 64/25* (2017.08); *B29C 64/386* (2017.08); *B33Y 10/00* (2014.12); *B33Y 30/00* (2014.12); *B33Y 50/00* (2014.12)

(58) Field of Classification Search
CPC ... G01B 11/2518; G01B 11/24; B29C 64/118; B29C 64/25; B29C 64/386; B29C 64/209; B29C 64/393; B33Y 10/00; B33Y 30/00; B33Y 50/00
See application file for complete search history.

(56) References Cited

U.S. PATENT DOCUMENTS

| | | | |
|---|---|---|---|
| 10,773,458 B2 | 9/2020 | Lou | |
| 2017/0050382 A1* | 2/2017 | Minardi | ............. G05B 19/4099 |
| 2017/0173867 A1* | 6/2017 | Zappitello | ............. B33Y 10/00 |
| 2017/0266727 A1 | 9/2017 | Nishino et al. | |
| 2021/0387416 A1 | 12/2021 | Mark | |

FOREIGN PATENT DOCUMENTS

| | | |
|---|---|---|
| WO | 2020/234310 | 11/2020 |
| WO | 2020/234312 | 11/2020 |

OTHER PUBLICATIONS

Extended European Search Report for EP Patent Application No. 23158477.2 dated Aug. 7, 2023.

* cited by examiner

*Primary Examiner* — Abdullahi Nur

(74) *Attorney, Agent, or Firm* — Kunzler Bean & Adamson

(57) ABSTRACT

A system and method for in-process inspection of a fused-filament fabricated part comprises an extrusion head and an associated laser profilometer for scanning and generating two-dimensional surface scans of additively deposited layers of the fused-filament fabricated part following material deposition of the layer by the extrusion head and prior to the deposition of subsequent layers. The surface scans are used to inspect the fused-filament fabricated part for defects during, or subsequent to, the fabrication of the part, either layer-by-layer or through a reconstruction of the part in three dimensions.

20 Claims, 13 Drawing Sheets

SYSTEM FOR IN-PROCESS INSPECTION OF FUSED-FILAMENT FABRICATED PARTS AND ASSOCIATED METHODS

FIELD

This disclosure relates generally to in-process inspection methods, and more particularly to the use of laser profilometers for in-process inspection of manufactured parts.

BACKGROUND

Testing fused-filament fabricated parts for systemic and non-systemic (e.g., random) defects or abnormalities helps to improve the overall quality of the part. Currently, the only means available to detect non-systemic defects is through a visual inspection of a completed part. Visual inspections can identify defects in the exterior surface of the completed part, but do not inform whether defects exist within the completed part. Systemic defects can be detected in completed parts through proof testing or testing on process-control coupons. However, proof testing, which is designed to test whether a completed part can withstand a specific load, can damage the part. Additionally, proof testing is not intended to predict fatigue life, which could be compromised by internal defects that go undetected. Process-control coupons (i.e., separate parts printed specifically for testing purposes during the fabrication of the completed part) only detect systemic problems, such as the failure of a heater in the printer environment during the fabrication of the completed part, and are not useful for identifying non-systemic defects.

Accordingly, conventional testing for non-systemic and systemic defects, after the completion of the part, is insufficient to prevent or identity internal defects or abnormalities within the completed part. Furthermore, disqualifying a part based on defects, discovered after the part is completed, is not labor or cost efficient.

SUMMARY

The subject matter of the present application has been developed in response to the present state of the art, and in particular, in response to the problems of and needs from conventional techniques for inspection of fused-filament fabricated parts that have not yet been fully solved by currently available systems. Generally, the subject matter of the present application has been developed to provide a system for in-process inspection of fused-filament fabricated parts, and associated methods, that overcome at least some of the above-discussed shortcomings of prior art systems.

Disclosed herein is a system for in-process inspection of a fused-filament fabricated part. The system comprises a build box, comprising an internal chamber and comprising an enclosure that encloses the internal chamber, wherein at least a portion of the enclosure comprises a window. The system also comprises an extrusion head, comprising a first portion, exterior to the build box, and a second portion, comprising at least one extrusion tip and extending through the enclosure of the build box and into the internal chamber of the build box. The system further comprises a laser profilometer, coupled with the first portion of the extrusion head at a location adjacent to the window of the enclosure, wherein the laser profilometer is configured to project a laser beam through the window and into the internal chamber. The preceding subject matter of this paragraph characterizes example 1 of the present disclosure.

The enclosure comprises a top side. The second portion of the extrusion head extends through the top side of the enclosure. The extrusion head is selectively movable relative to the internal chamber and in a plane parallel to the top side of the enclosure. The preceding subject matter of this paragraph characterizes example 2 of the present disclosure, wherein example 2 also includes the subject matter according to example 1, above.

The extrusion head is selectively movable such that the laser beam of the laser profilometer follows a raster scanning pattern when the laser beam is projected through the window and into the internal chamber. The raster scanning pattern comprises a plurality of linear paths. The preceding subject matter of this paragraph characterizes example 3 of the present disclosure, wherein example 3 also includes the subject matter according to example 2, above.

The top side of the enclosure of the build box comprises pleated-insulating elements configured to retract or expand when the extrusion head selectively moves relative to the top side of the enclosure of the build box. The second portion of the extrusion head extends through the pleated-insulating elements. The window is positioned laterally adjacent to the second portion of the extrusion head. The second portion of the extrusion head and the window are surrounded by the pleated-insulating elements. The window and the extrusion head are co-movable relative to the internal chamber. The preceding subject matter of this paragraph characterizes example 4 of the present disclosure, wherein example 4 also includes the subject matter according to any of examples 2-3, above.

The system further comprises a build platform within the internal chamber of the build box. The build platform is selectively movable, relative to the internal chamber, in a direction perpendicular to the plane parallel to the top side of the enclosure. The preceding subject matter of this paragraph characterizes example 5 of the present disclosure, wherein example 5 also includes the subject matter according to of any examples 2-4, above.

The system further comprises a housing coupled with the laser profilometer. The housing at least partially surrounding and spaced apart from the laser profilometer such that air gaps are defined between the housing and the laser profilometer. The preceding subject matter of this paragraph characterizes example 6 of the present disclosure, wherein example 6 also includes the subject matter according to any of examples 1-5, above.

The system further comprises a cooling system coupled with the housing and configured to force air through the air gaps defined between the housing and the laser profilometer. The preceding subject matter of this paragraph characterizes example 7 of the present disclosure, wherein example 7 also includes the subject matter according to example 6, above.

The system further comprises a shielding surrounding at least a portion of the build box and configured to shield the build box from ambient light when the laser profilometer is projecting the laser beam through the window and into the internal chamber. The preceding subject matter of this paragraph characterizes example 8 of the present disclosure, wherein example 8 also includes the subject matter according to any of examples 1-7, above.

Further disclosure here is a system for in-process of a fused-filament fabricated part. The system comprises a build platform, comprising a building surface. The system also comprises a support system vertically spaced apart from the build platform and selectively movable in a plane parallel to the build platform. The system further comprises an extrusion head, comprising a first portion and a second portion.

The extrusion head is couplable to the support system. The second portion comprises at least one extrusion tip. The system additionally comprises a laser profilometer couplable to the support system. The laser profilometer is configured to project a laser beam in a direction towards the build platform when the laser profilometer is attached to the support system. The preceding subject matter of this paragraph characterizes example 9 of the present disclosure.

The system further comprises a shielding, surrounding at least the build platform and the laser beam projected by the laser profilometer when the laser profilometer projects the laser beam in the direction towards the build platform. The shielding is configured to shield the build platform and the laser beam from ambient light. The preceding subject matter of this paragraph characterizes example 10 of the present disclosure, wherein example 10 also includes the subject matter according to example 9, above.

The laser profilometer is directly couplable to the support system separately from the extrusion head such that when the laser profilometer is coupled to the support system the extrusion head is not coupled to the support system. The preceding subject matter of this paragraph characterizes example 11 of the present disclosure, wherein example 11 also includes the subject matter according to any of examples 9-10, above.

Alternatively, the laser profilometer is coupled to the first portion of the extrusion head when the extrusion head is coupled to the support system. The preceding subject matter of this paragraph characterizes example 12 of the present disclosure, wherein example 12 also includes the subject matter according to any of examples 9-11, above.

Additionally, disclosed herein is a method of in-process inspecting a part. The method comprises the step of extruding a fused-filament material from at least one extrusion tip of an extrusion head onto a building surface of a build platform to fabricate a layer of a part. The extrusion head is coupled with a support system. Additionally, the extrusion head is selectively moved in a plane parallel to the building surface of the build platform when extruding the fused-filament material and when the at least one extrusion tip is a building-distance from the building surface. The method also comprises the step of generating a laser beam from a laser profilometer at a scanning-distance from the layer of the part, the laser profilometer coupled with the support system. The method further comprises the step of scanning the layer of the part with the laser beam generated by the laser profilometer while selectively moving the laser profilometer relative to the building surface of the build platform. The method additionally comprises the step of generating a scanning image based on the scan of the layer of the part. The method also comprises the step of inspecting the scanning image for defects in the layer of the part. The preceding subject matter of this paragraph characterizes example 13 of the present disclosure.

The method further comprises the step of moving the build platform in a direction perpendicular to the building surface, such the at least one extrusion tip of the extrusion head is the building-distance from the layer of the part. The method also comprises extruding the fused-filament material from the at least one extrusion tip of the extrusion head onto the layer of the part to fabricate a second layer of the part, when the extrusion head is selectively moved relative to the building surface of the build platform. The method also comprises the step of generating the laser beam from the laser profilometer at the scanning-distance from the second layer of the part. The method further comprises the step of scanning the second layer of the part with the laser beam generating by the laser profilometer while selectively moving the laser profilometer relative to the building surface of the build platform. The method additionally comprises the step of generating a second scanned image based on the scan of the second layer of the part. The method further comprises inspecting the second scanned image for defects in the second layer of the part. The preceding subject matter of this paragraph characterizes example 14 of the present disclosure, wherein example 14 also includes the subject matter according to example 13, above.

The method further comprises a step of generating a three-dimensional image of the part using at least the scanned image and the second scanned image and inspecting the three-dimensional image of the part for defects in the layer and the second layer of the part. The preceding subject matter of this paragraph characterizes example 15 of the present disclosure, wherein example 15 also includes the subject matter according to example 14, above.

The method further comprises a step of performing in-process corrections to defects in the layer of the part is response to inspecting the scanned image for defects in the layer of the part. The preceding subject matter of this paragraph characterizes example 16 of the present disclosure, wherein example 16 also includes the subject matter according to any of examples 13-15, above.

The step of scanning the layer of the part with the laser beam comprises scanning the layer of the part by moving the laser beam in a raster scanning pattern comprising a plurality of linear paths. Each one of the plurality of linear paths at least partially overlapping an adjacent one of the plurality of linear paths. The step of generating the scanned image comprises generating an individual scanned image for each one of the plurality of linear paths and processing the individual scanned images to generate a processed image of the layer of the part. The preceding subject matter of this paragraph characterizes example 17 of the present disclosure, wherein example 17 also includes the subject matter according to any of examples 13-16, above.

The step of generating a scanning image based on the scan of the layer further comprises performing skew correction on the scanned image to eliminate image distortion resulting from angular misalignment of the laser profilometer relative to the build platform. The preceding subject matter of this paragraph characterizes example 18 of the present disclosure, wherein example 18 also includes the subject matter according to any of examples 13-17, above.

The step of inspecting the scanned image for defects in the layer of the part comprises comparing the scanned image to a representative model of the layer that is free of defects to detect differences between the scanned image and the representative model. The preceding subject matter of this paragraph characterizes example 19 of the present disclosure, wherein example 19 also includes the subject matter according to any of examples 13-18, above.

The build platform is located within an internal chamber enclosed by an enclosure of a build box. The support system is located at a top side of the enclosure. The extrusion head comprises a first portion, exterior to the build box, and a second portion, comprising the at least one extrusion tip and extending through the enclosure of the build box and into the internal chamber of the build box. The laser profilometer is coupled with the first portion of the extrusion head and adjacent to a window of the enclosure. The laser profilometer projects the laser beam through the window when scanning the layer of the part. The internal chamber is heated when the layer of the part is fabricated on the building surface of the build platform. The preceding subject matter of this paragraph characterizes example 20 of the present disclosure, wherein example 20 also includes the subject matter according to any of examples 13-19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Figure 1:
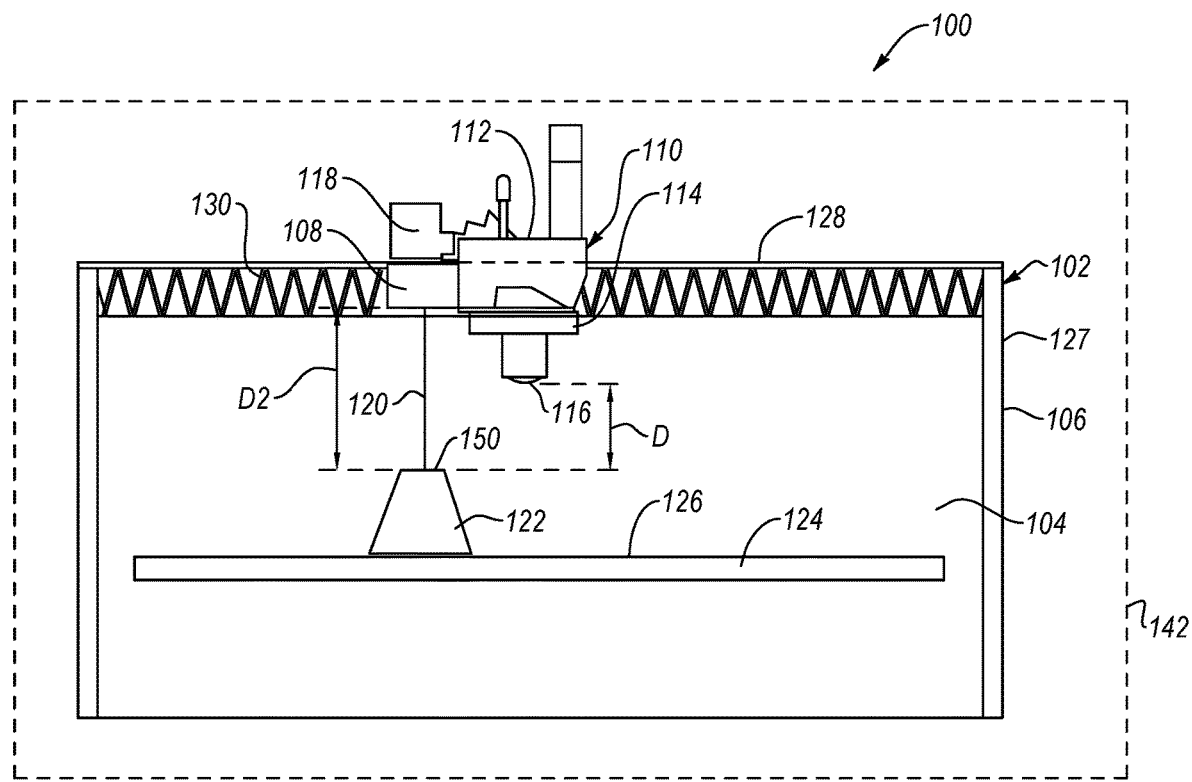
FIG. 1 is a schematic, sectional, perspective view of a system for in-process inspection of a fused-filament fabricated part, according to one or more examples of the present disclosure.

Reference throughout this specification to "one example," "an example," or similar language means that a particular feature, structure, or characteristic described in connection with the example is included in at least one example of the subject matter of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the subject matter of the present disclosure, however, absent an express correlation to indicate otherwise, an implementation may be associated with one or more examples.

The present disclosure is directed to systems and methods for in-process inspection of fused-filament fabricated parts. Fused-filament fabrication (FFF) is a type of three-dimensional (3D) printing process (e.g., additive manufacturing (AM) process), used to create a 3D part where layers of material are formed, typically under computer control, to create a manufactured part. Manufactured parts can be of almost any shape or geometry and are produced using digital model data from a model or other electronic data source. Therefore, compared to removing material from a stock piece, as may be done in a conventional machining process, 3D printing or AM builds a three-dimensional part by successively adding material layer-by-layer to accurately produce a part having desired dimensions and geometry. During FFF, a part is produced by extruding small beads or streams of material which harden immediately to form layers. Typically, a filament of thermoplastic material, metal in the form of metal wire, or other material is fed into an extrusion nozzle head (e.g., 3D printer extruder herein referred to as a "extrusion head"), that heats the material and produces a deposit material flow.

During fabrication of the fused-filament fabricated part, a laser profilometer is used to non-destructively evaluate the part. The laser profilometer is used to inspect an individual deposited layer or layers in situ, after the layer is deposited and prior to depositing subsequent layers. The inspection can identify defects or abnormalities in the part as the part is fabricated. In other words, defects can be identified immediately after material deposition of each layer or a selected set of layers, and therefore before completion of the entire part. Accordingly, the laser profilometer is configured to inspect at least one individual layer of deposited material after the material is deposited. In some examples, due to the number of layers in a part, selected layers, such as every other layer of the part, can be inspected. The in-process inspection of incremental deposited layers of the part, using the laser profilometer, facilities the inspection of the part during a build. Detection of a defect, during the build, allows for the defect to be addressed much sooner in the manufacturing process.

Early detection of a defect or abnormality during a build helps reduce wasted labor and material, helps obviate part replacement costs, and can help to increase safety. For example, extra material inadvertently deposited on a layer could be identified as a defect during the in-process inspection of the layer and removed by an operator before the subsequent layer is printed. In other examples, an in-process inspection could identify a progressive decrease in the density of the deposited material from one layer to another layer and the system can be instructed to increase the density of the material in subsequent layers before the build density of the part becomes unacceptably low. Furthermore, early detection can impart required part inspection and quality for FFF parts that may enable the certification of FFF structural parts used in many industries, including the aircraft and aerospace industries. In-process inspection, using a laser profilometer, can be utilized as the exclusive means of inspecting a part. Alternatively, in some cases, further testing for systemic and non-systemic defects can be employed, such as visual inspections of the part and/or testing on process-control coupons printed during the fabrication of the part.

Referring to FIG. 1, a system 100 for in-process inspection of a fused-filament fabricated part 122 is shown. The system 100 includes a build box 102, an extrusion head 110, and a laser profilometer 118. The build box 102 is an example of one type of support system, configured to support and permit the extrusion head 110 and/or laser profilometer 118 to selectively move. The build box 102 includes an enclosure 106 that defines and surrounds an internal chamber 104 of the build box 102. The build box 102 houses a part 122 within the internal chamber 104, during the layer-by-layer fabrication of the part 122. In some examples, the internal chamber 104 is configured to be heated and maintained at a process temperature during the process of depositing a number of material layers of the part 122. For example, the internal chamber 104 may be maintained at a temperature ranging from about 300° F. to about 450° F. In other examples, the internal chamber 104 is maintained at a temperature ranging from about 300° F. to 428° F. In further examples, the internal chamber 104 is maintained at a temperature of at least 180° F.

Figure 3:
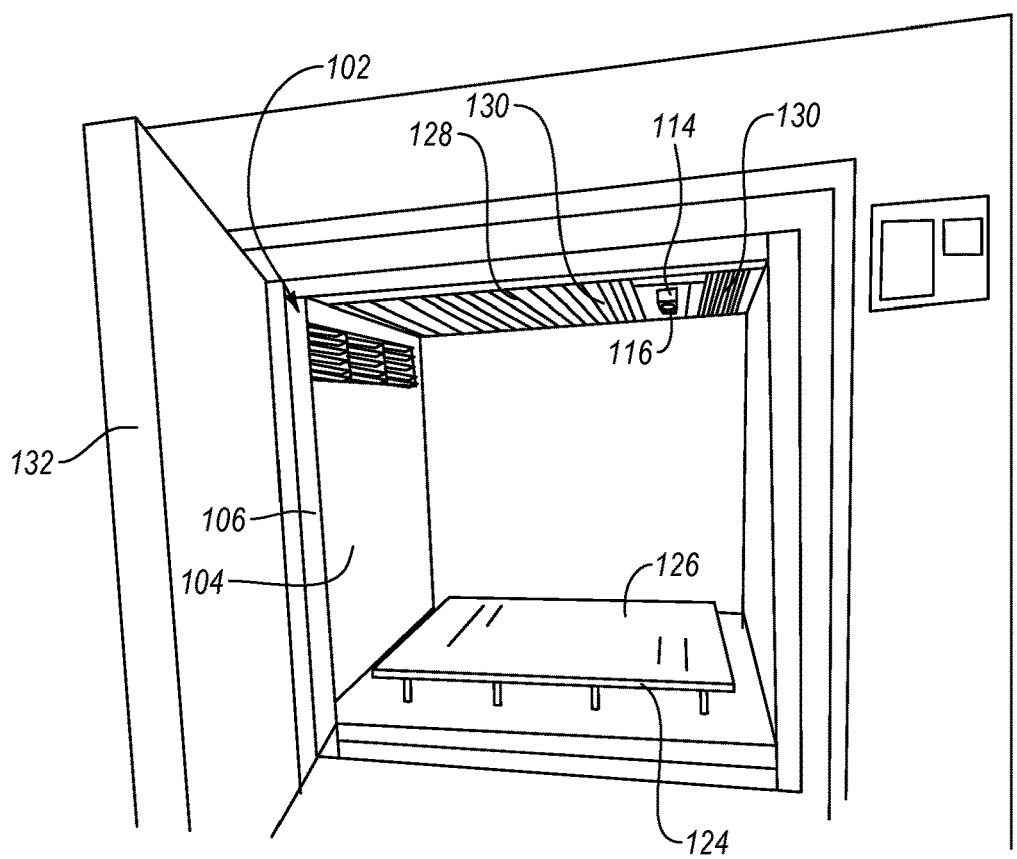
FIG. 3 is a schematic perspective view of an internal chamber of a build box, according to one or more examples of the present disclosure.
Figure 4:
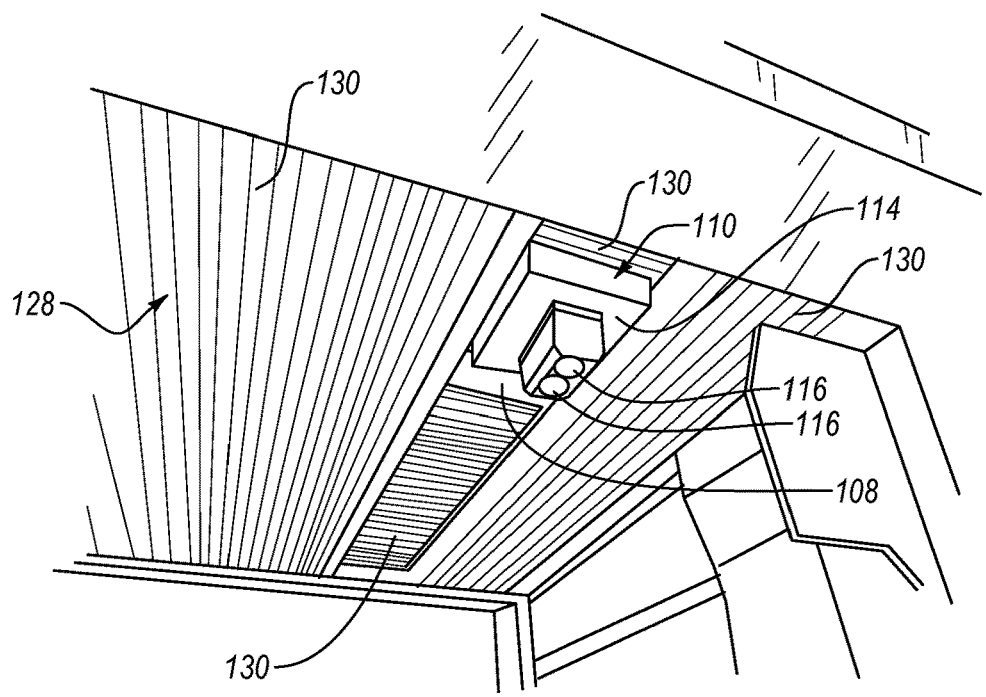
FIG. 4 is a schematic perspective view of a top side of the build box of FIG. 3, from inside the internal chamber, according to one or more examples of the present disclosure.
Figure 5:
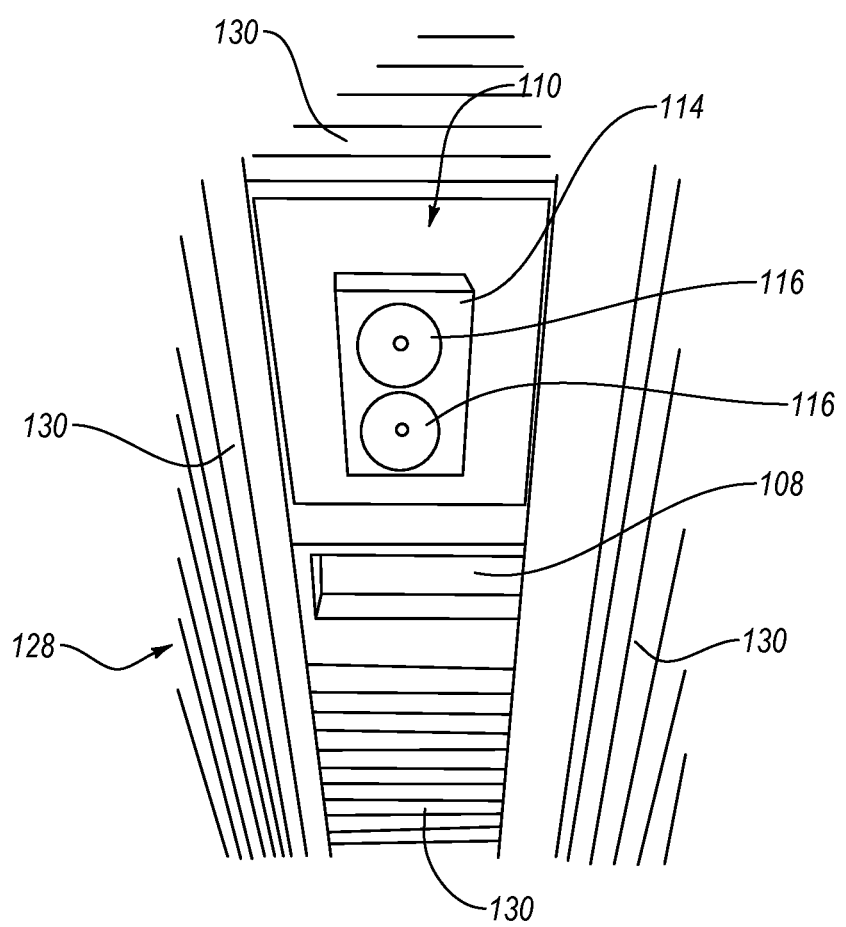
FIG. 5 is a schematic upward view of the top side of the build box of FIG. 4, from inside the internal chamber of the build box, according to one or more examples of the present disclosure.

The system 100 further includes a build platform 124 within the internal chamber 104. The build platform 124 includes a building surface 126 that is vertically spaced apart from a top side 128, or roof, of the build box 102 when the top side 128 of the build box 102 is parallel to a horizontal plane. The build platform 124 is selectively movable, relative to the internal chamber 104, in a direction perpendicular to a plane parallel to the top side 128 of the enclosure 106 or perpendicular to the building surface 126 of the build platform 124. In other words, the build platform 124 is movable vertically within the build box 102. In some examples, the build box 102 also includes a door 132 (see, e.g., FIG. 3) to provide access to the internal chamber 104, before, during, or after fabrication of the part 122.

The enclosure 106 of the build box 102 further includes a window 108 in the top side 128 of the enclosure 106. The window 108 is made of a material that permits an unobstructed view from the exterior of the build box 102 into the internal chamber 104, such as a window 108 made from borosilicate glass. Generally, the window 108 is in the top side 128 of the enclosure 106 laterally adjacent to the extrusion head 110.

The extrusion head 110 of the system 100 has a first portion 112, exterior to the build box 102, and a second portion 114, extending through the enclosure 106 of the build box 102 and into the internal chamber 104. The second portion 114 includes at least one extrusion tip 116 that is configured to extrude a material during use of the extrusion head 110. A wide variety of materials can be extruded from the extrusion head 110 including, but not limited to, thermoplastics, such as acrylonitrile butadiene styrene (ABS), polyacetic acid, high-impact polystyrene, thermoplastic polyurethane, aliphatic polyamides, polyether ether ketones (PEEKs), as well as metals and composite materials, including ceramics.

Figure 2:
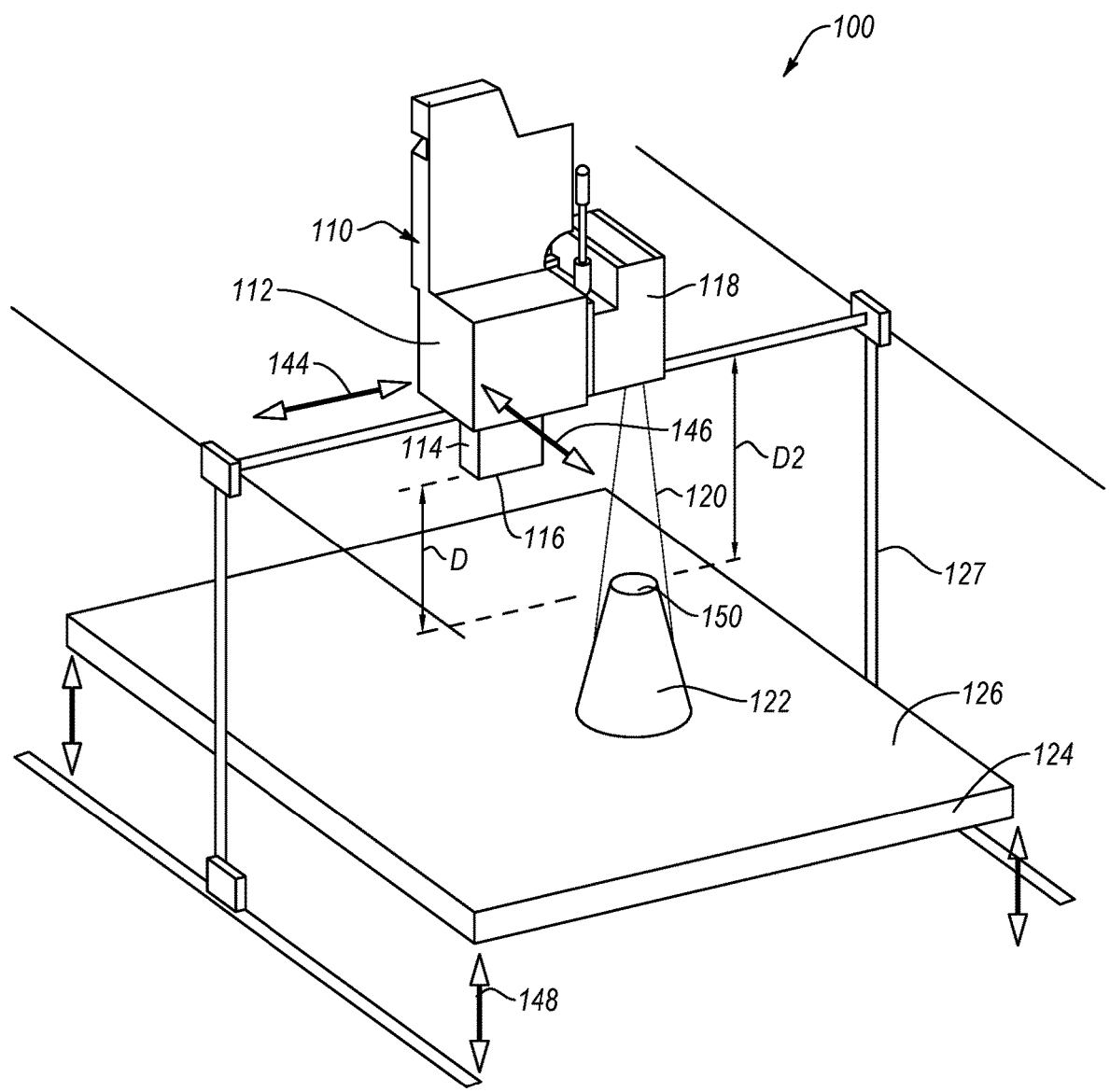
FIG. 2 is a schematic perspective view of a system for in-process inspection of a fused-filament fabricated part, according to one or more examples of the present disclosure.

During fabrication of the part 122, the extrusion head 110 is moved, under computer control to make a desired part with desired dimensions, layer-by-layer. Accordingly, the extrusion head 110 extrudes the layer while moving in two dimensions to deposit one horizontal layer at a time on the building surface 126 of the build platform 124. In other words, the extrusion head 110 moves in the plane parallel to the top side 128 of the enclosure 106 (and the building surface 126) in a first direction 144 and a second direction 146, while depositing the layer (see, e.g., FIG. 2). In some examples, the extrusion tip 116 is a building-distance D from the most recently fabricated layer during the fabrication of a succeeding layer of the part 122. In other words, as shown in FIG. 2, the build platform 124 is moved in a vertical direction, or in a third direction 148, downward from the extrusion tip 116 such that the previously deposited layer is at the building-distance D away from the extrusion tip 116, before the succeeding layer of the part 122 is deposited. In other cases, the extrusion head 110 can also move in a vertical direction, such that the extrusion tip 116 can be moved upwardly away from the build platform 124 to maintain the building-distance D from the most recently fabricated layer.

As shown in FIGS. 1 and 3-5, in some examples, the top side 128 of the enclosure 106 of the build box 102 is made of pleated-insulating elements 130 that allow the extrusion head 110 to selectively move in the first direction 144 and the second direction 146. The pleated-insulating elements 130 are made of a material configured to thermally isolate the internal chamber 104 from the environment external to the top side 128 of the build box 102. The second portion 114 of the extrusion head 110 and the window 108, positioned laterally adjacent to the second portion 114, extend through the pleated-insulating elements 130, such that the pleated-insulating elements 130 are located adjacent to each outer side of the second portion 114 and the window 108. Through retraction or expansion, such as in an accordion-like manner, the pleated-insulating elements 130 permit the extrusion head 110 and window 108 to selectively move. In other words, the extrusion head 110 and the window 108 are co-movable relative to the internal chamber 104 in the first direction 144 and the second direction 146.

The laser profilometer 118 of the system 100 is configured to be coupled to the first portion 112 of the extrusion head 110 at a location exterior to the build box 102 and vertically adjacent to the window 108 of the enclosure 106. That is, a laser beam 120, when projected from the laser profilometer 118, is projected through the window 108 and into the internal chamber 104 of the build box 102. During operation, the laser beam 120 of the laser profilometer 118 is scanned across the most recently fabricated layer of the part 122, without any portion of the laser profilometer 118 contacting the layer, to measure a surface profile of the layer, to determine its micro-scale roughness, and to produce a two-dimensional image of the layer (e.g., a scanned image). Specifically, a sensor of the laser profilometer 118 projects the laser beam 120 onto the surface of the layer to be measured and an offset camera of the laser profilometer 118 observes a diffuse laser reflection from the surface of the layer. The scan data is gathered while moving the laser profilometer 118 across the layer. For example, as the laser profilometer 118 is moved, surface heights within the layer can be calculated accurately using triangulation to produce the two-dimensional scanned image. In some cases, in addition to measuring the micro-scale roughness of the layer, the laser profilometer 118 can detect a color or grayscale luminance of the layer. Detection of color is useful in situations where two or more materials, having different colors, such as a model material and a support material, are extruded from separate extrusions tips 116 of the extrusion head 110. Defects, such as the model material being deposited in a location which should have been occupied by the support material, can be detected and distinguished based on the differences of color of the material being deposited.

While scanning the layer of the part 122, the laser profilometer 118, which is coupled to the extrusion head 110, is moved simultaneously with the extrusion head 110. The laser beam 120 is projected through the window 108 and moved in the first direction 144 and the second direction 146 while scanning the most recently fabricated layer of the part 122. Referring to FIG. 2, a scanning-distance D2, measured from the base of the laser profilometer 118 (or the location at which the laser beam 120 is generated) to the most recently fabricated layer of the part 122, is maintained during the scanning process. Accordingly, the build platform 124 is moved in the vertical direction, or in the third direction 148, downward, relative to the top side 128 of the enclosure 106, from a previous distance while scanning the prior layer, to the scanning-distance D2, before the succeeding layer of the part 122 is scanned. In some examples, the building-distance D and the scanned-distance D2 are different. Therefore, the build platform 124 is moved to the building-distance D before a layer is deposited and during the fabrication of the layer, and then moved to the scanning-distance D2 after the layer is fabrication and during the scanning of the layer. Thereafter, the build platform 124 is moved to the building-distance D and scanning-distance D2 for the fabrication of subsequent layers and scanning of subsequent layers, respectively.

As indicated by a dashed line in FIG. 1, in some examples, a shielding 142 that is impervious to light surrounds at least a portion of the build box 102. When the build box 102 is situated in an environment with ambient light, the laser profilometer 118 may have difficulty resolving the diffuse laser reflection of the laser beam 120 generated by the laser profilometer 118 from light entering the internal chamber 104 of the build box 102 through the window 108 or any other transparent or translucent surface of the enclosure 106. Optically shielding the build box 102, using the shielding 142, prevents ambient light from entering the internal chamber 104. The shielding 142 may be used in situations where the laser profilometer 118 has no optical filter or lower-quality optics. Additionally, the shielding 142 may be utilized when the laser profilometer 118 is used without a build box. In this case, the shielding 142 surrounds at least the build platform 124 and the laser beam 120 projected by the laser profilometer 118, when the laser profilometer 118 is projecting the laser beam 120 in the direction towards the build platform 124.

In some examples, the extrusion head 110 and the laser profilometer 118 are utilized for the fabrication of a part and in-process inspections without a build box. For example, as shown in FIG. 2, the extrusion head 110 and the laser profilometer 118 are couplable to a support system 127. The support system 127 is vertically spaced apart from the build platform 124 and selectively movable in a plane parallel to the build platform 124. In some examples, the laser profilometer 118 is coupled to the first portion 112 of the extrusion head 110 when the extrusion head 110 is coupled to the support system 127. In other words, the extrusion head 110 and the laser profilometer 118 are coupled together and co-moveable. In other examples, the laser profilometer 118 is directly couplable to the support system 127, separately from the extrusion head 110, such that when the laser profilometer 118 is coupled to the support system 127 the extrusion head 110 is not coupled to the support system 127. During fabrication or scanning of a layer of the part 122, the extrusion head 110 and/or laser profilometer 118 is moved, via the support system 127, in two dimensions (e.g., the first direction 144 and the second direction 146) in the plane parallel to the build platform 124. The build platform 124 is moved in a vertical direction, the third direction 148, downward or upward to maintain the building-distance D during the fabrication process or the scanning-distance D2 during the scanning process, as described.

Figure 6:
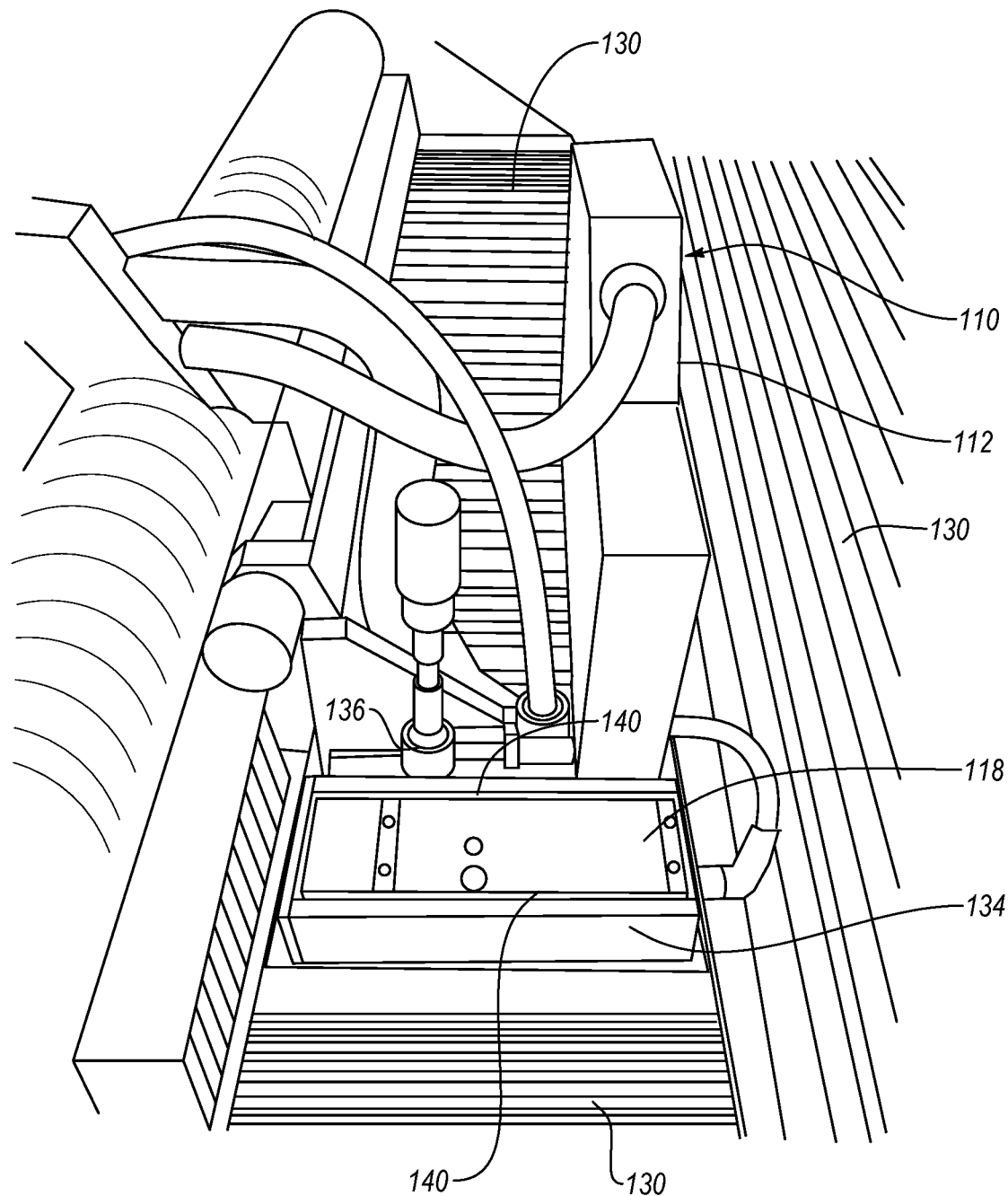
FIG. 6 is a schematic perspective view of an extrusion head and a laser profilometer, according to one or more examples of the present disclosure.
Figure 7:
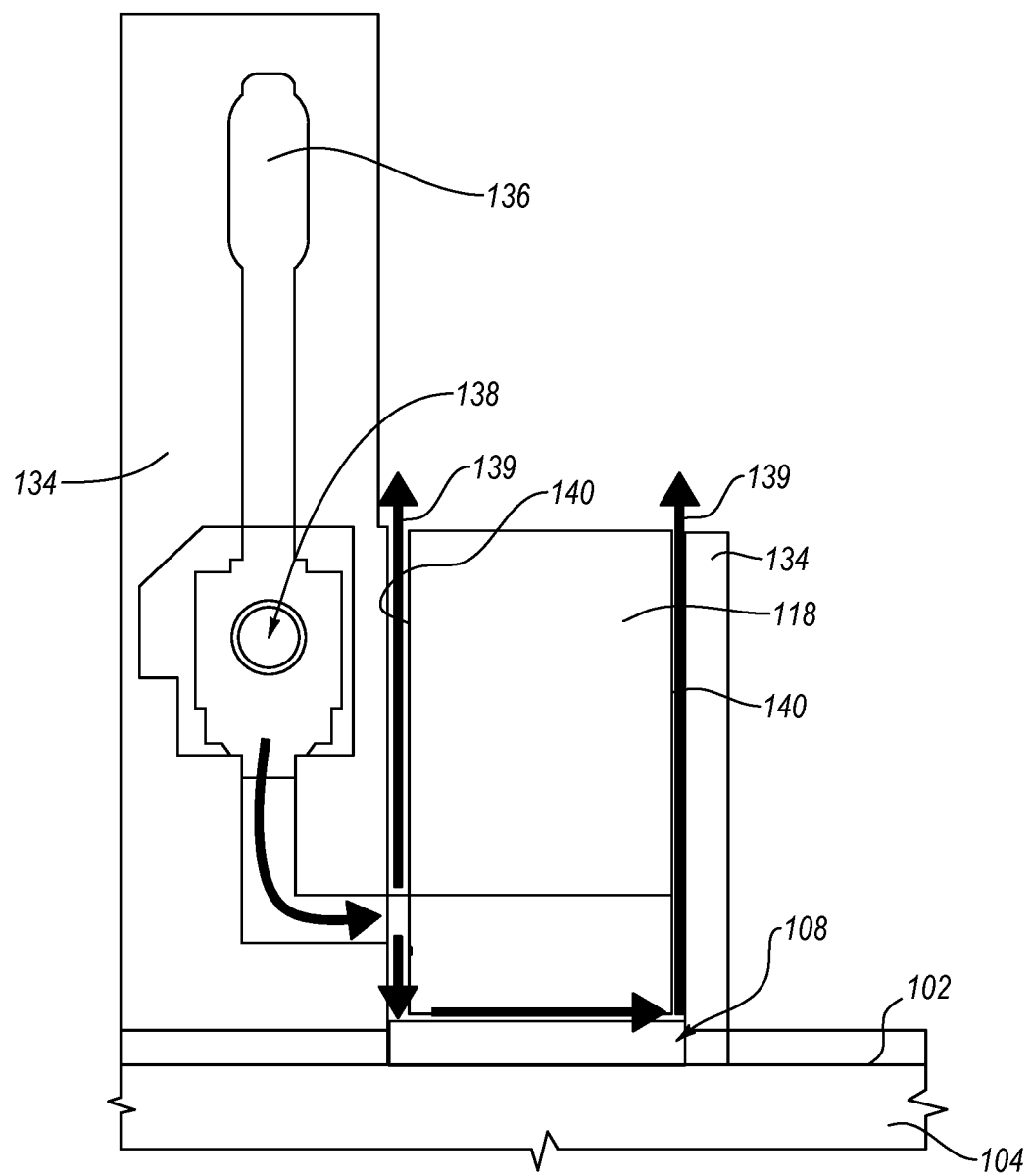
FIG. 7 is a schematic, sectional, side elevation view of a laser profilometer and a cooling system, according to one or more examples of the present disclosure.

Referring to FIGS. 6-7, an exterior view of the top side 128 of the build box 102 of FIG. 1 is shown. The laser profilometer 118 is coupled to the first portion 112 of the extrusion head 110 and vertically adjacent to the window 108 in the top side 128 of the build box 102. In some cases, the laser profilometer 118 is temperature-sensitive and can be adversely impacted by significantly elevated temperature environments, such as a heated internal chamber 104 of the build box 102 (e.g., ranging from about 300° F. to about 450° F.). In other words, to function properly, the laser profilometer 118 is maintained at a temperature below the temperature of the heated internal chamber 104. In some examples, the laser profilometer 118 is required to be maintained at a temperature below 113° F. Although the laser profilometer 118 is exterior to the build box 102, the window 108 between the laser profilometer 118 and the internal chamber 104 can conduct heat from the internal chamber 104 thus making the laser profilometer 118 suspensible to an increase in temperature. Therefore, in some cases, a housing 134 that provides thermal protection is coupled with the laser profilometer 118 and at least partially surrounds and is spaced apart from the laser profilometer 118, such that air gaps 140 are defined between the housing 134 and the laser profilometer 118. The housing 134 may be further coupled to a cooling system 136 configured to force cooling air through the air gaps 140 defined between the housing 134 and the laser profilometer 118. The cooling air is controlled through an air intake 138 that moves the cooling air through the air gaps 140 and out openings 139 to the external environment.

Figure 8:
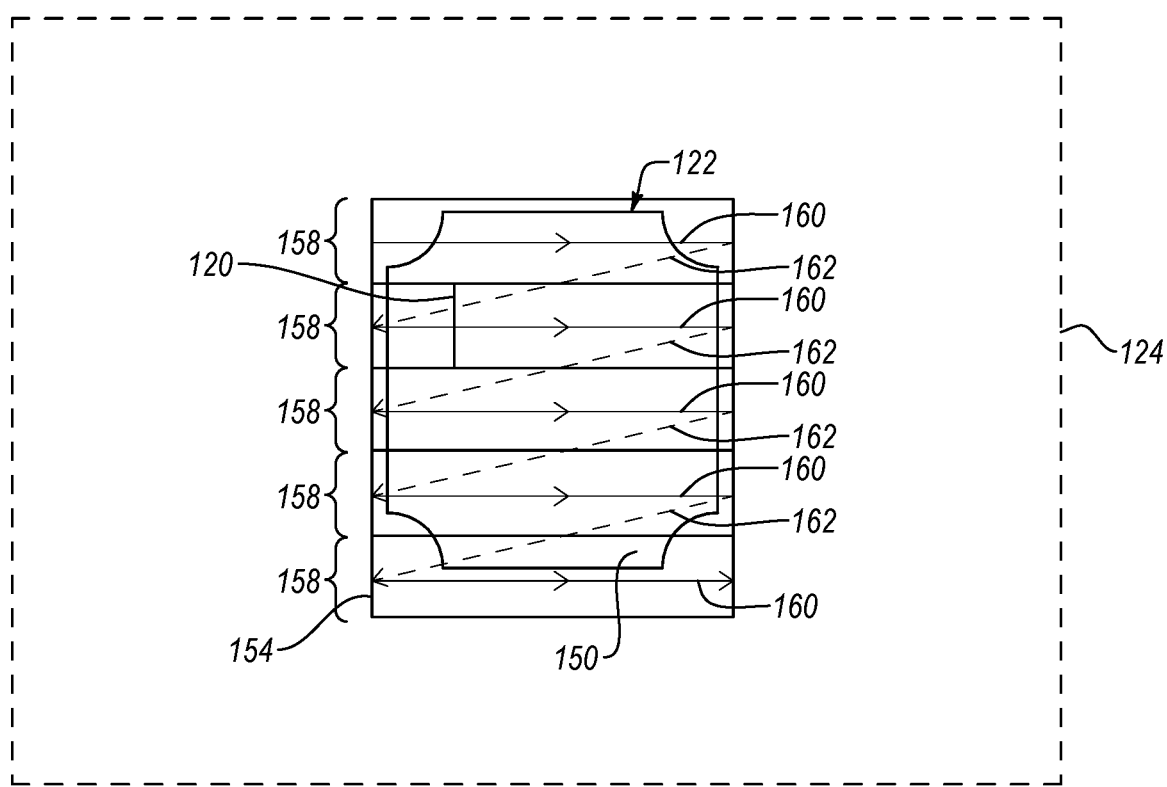
FIG. 8 is a schematic top plan view of a layer of a part overlaid with the scan pattern of a laser beam of a laser profilometer, according to one or more examples of the present disclosure.

Depending on the particular size and dimensions of the layer being scanned, the laser profilometer 118 may need to make multiple scan passes of a layer of the part 122. One such scan pattern of the layer 150 of the part 122 is shown in FIG. 8. Scanning the layer 150 in a raster scanning pattern, the layer 150 is divided into a plurality of linear paths 158. As the laser profilometer 118 is moved along one of the plurality of linear paths 158, the laser beam 120 moves in a scan move 160 while scanning the linear path 158 and generating an individual scanned image of the corresponding one of the linear paths 158. Subsequently, the laser profilometer 118 is moved in a non-scan move 162 to another one of the plurality of linear paths 158. The process is continued, moving the laser profilometer 118 between the scan move 160 and the non-scan move 162, while each one of the plurality of linear paths 158 is scanned, generating a plurality of individual scanned images. The individual scanned images are raw images (e.g., not processed) that can undergo image processing or be combined together, as is, to form a full scanned image of the layer 150.

Figure 9A:
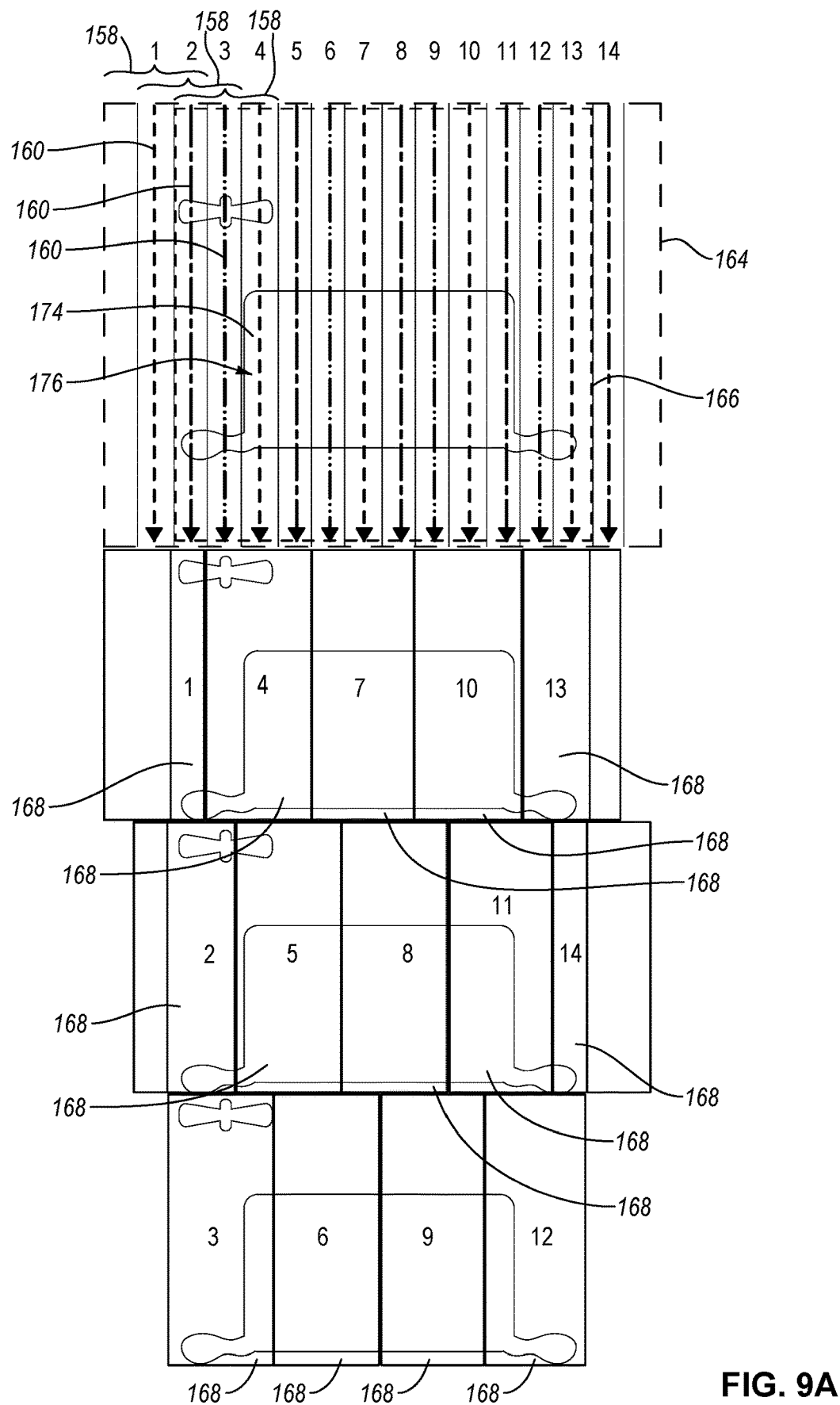
FIG. 9A is a schematic top plan view of a layer of a part overlaid with the scan pattern of a laser beam of a laser profilometer, where the scan pattern has a plurality of linear paths, and individual scanned images of each one of a plurality of linear paths, according to one or more examples of the present disclosure.
Figure 9B:
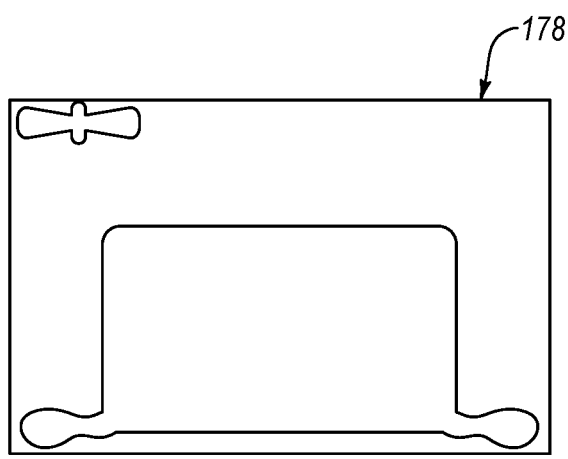
FIG. 9B is a schematic top plan view of a processed image of the layer of the part of FIG. 9A, according to one or more examples of the present disclosure.

In some examples, the plurality of linear paths 158 of the scan pattern at least partially overlaps an adjacent one of the plurality of linear paths 158. For example, as shown in FIG. 9A, a layer 174 of a part 176 is divided into a plurality of linear paths 158. A smaller region of interest 166, which includes the layer 174, is within a larger scanned region 164, with the plurality of linear paths 158 extending along the entirety of the scanned region 164. Moving along each one of the linear paths 158, the laser profilometer 118 moves in a scan move 160 while scanning the linear path 158 and generates a corresponding individual scanned image 168. Sufficient overlap exists between the sequential linear paths 158 so that a pixel, corresponding to any given location of the layer 174 will be captured in multiple consecutive ones of the individual scanned images 168. Processing the individual scanned images 168 requires overlaying all of the individual scanned images 168 to form an overlaid image and then cropping out and discarding any area within the overlaid image that has less than a specified replicate number $N_R$ of pixel density. In other words, the region of interest 166 has the specified replicate number $N_R$ of pixel density and at least a portion of the scanned region 164, which has less than the required pixel density, will be cropped and discarded. This ensures that the final scanned image 178, as shown in FIG. 9B, has uniform image quality. In some examples, the replicate number $N_R$ may be 3; however, a larger replicate number $N_R$, which requires a scanned region 164 to be divided into smaller linear paths 158, can be used to improve image quality.

A variety of processing methods can be performed on individual scanned images 168, to process the raw images into higher quality images, as known in the art of image processing. For example, skew correction can be performed, using computer software, on individual scanned images 168 to eliminate image distortion resulting from angular misalignment of the laser profilometer 118 relative to the build platform 124. Such angular misalignment may be created when the laser profilometer 118 is coupled to the extrusion head 110, or the support system 127 askew, such that the laser beam 120 of the laser profilometer 118 is non-perpendicular, relative to the build platform 124, as it moves across the layer of the part (e.g., scan move). Additionally, or alternatively, a median stacking process can be performed by synthesizing multiple full scanned images of a layer into a single high-quality image of the layer. Median stacking can reduce the amount of noise (e.g., random variations of brightness in the images) in the high-quality image. As the laser profilometer 118 is susceptible to both reflective noise, which would falsely indicate the presence of material, and underexposure, which would falsely indicate the absence of material, noise reduction using median stacking or other noise reduction methods, can minimize both types of error without introducing bias toward the detection of more or less material. The single high-quality image can be further processed for rotation, contrast, and rescaling of the image, if needed. Rotation refers to rotating the image to display the image to an operator in the same orientation as a build file that was used during the fabrication of the part. Additionally, contrast refers to amplifying existing differences among pixels in the image to further distinguish any defects in the image. Finally, scaling refers to eliminating distortions in an aspect ratio of the scanned images to achieve a known, uniform resolution, so that measurements can be taken from the image directly. After processing, raw images are modified into high-quality full-layer images that can more easily be used to identity defects.

Figure 10:
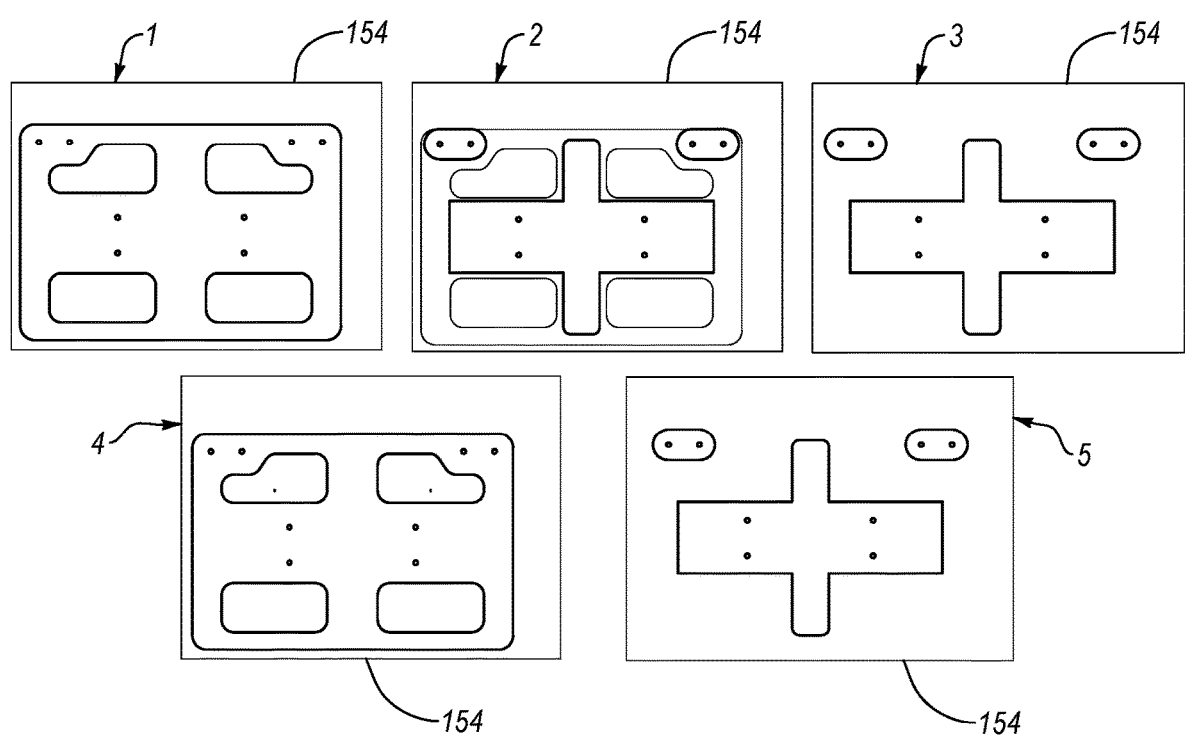
FIG. 10 is a schematic top plan view of a scanning image for each of multiple layers of a part, according to one or more examples of the present disclosure.

Referring to FIG. 10, a plurality of scanned images 154, which include an image of full layers of the part, after processing if necessary, are shown. A part, which may be made up of a large number of different layers, such as hundreds or thousands, has a scanned image 154 that corresponds to each layer, or selected layers, that were scanned by the laser profilometer. Each scanned image 1-5 corresponds to a representative one of a large number of different layers of the part. The plurality of scanned images 154 can be individually inspected immediately after the layer of the part is scanned and the corresponding one of the scanned images is generated and processed, if necessary. Inspecting the scanned image 154 after each layer is fabricated (e.g., layer-by-layer) enables in-process corrections to be performed. In other examples, the plurality of scanned images 154 can be individually inspected after the full part is fabricated. Additionally, or alternatively, the plurality of scanned images 154 can be combined together, using commercially available software, to generate a 3D image, which can be inspected for defects by comparing the 3D image to a 3D model of the part.

Figure 11:
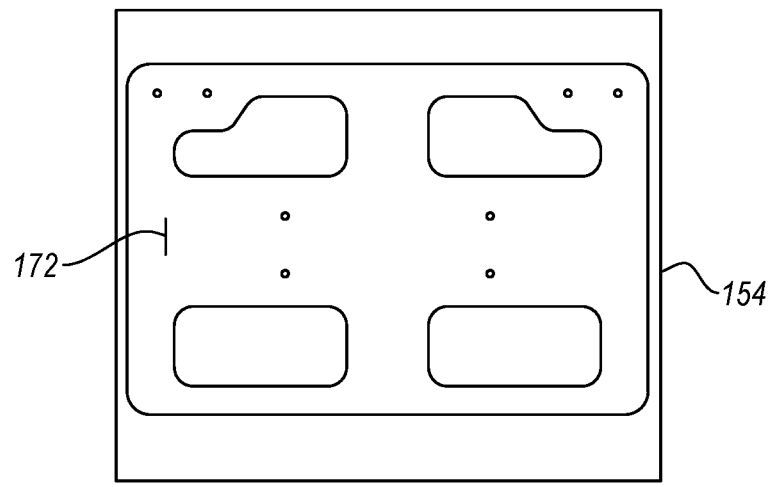
FIG. 11 is a schematic top plan view of a scanned image of a layer of a part and a representative model of the layer and the part, according to one or more examples of the present disclosure.
Figure 11:
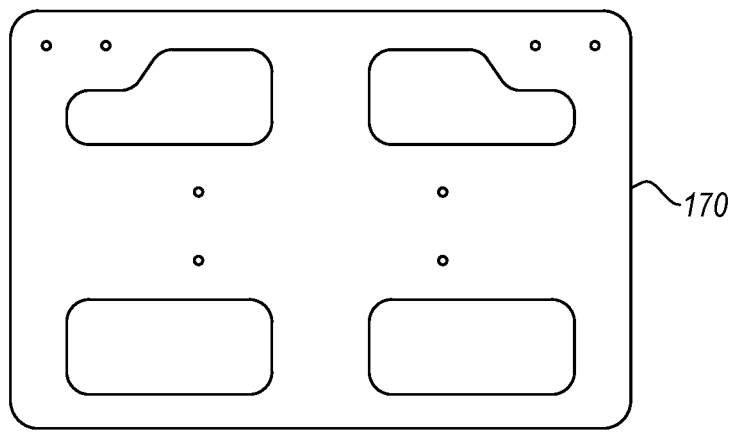

Defect detection can be performed on the plurality of scanned images 154 or 3D image either manually or through automatic defect detection. Manual in-process inspection of each layer can be tedious, therefore, in some examples, automated defect detection can be used to inspection the part and alert an operator to defects as they occur during the fabrication process. As shown in FIG. 11, the scanned image 154 includes a defect 172. By comparing, either manually or automatically, the scanned image 154 of an individual layer of a part to a representative model 170 of the corresponding layer, such as a CAD model, it is possible to detect the difference indicating defects between the scanned image 154 and the representative model 170.

Figure 12:
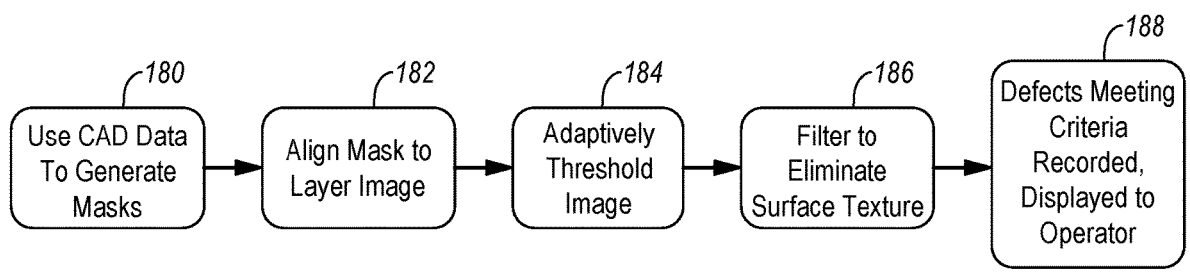
FIG. 12 is a schematic flow diagram of a method of automatic defect detection, according to one or more examples of the present disclosure.

As shown in FIG. 12, a flow chart depicting one method of automatic defect detection is shown. As used herein a defect is any region within a part where the part building material was not deposited correctly, such as an inclusion (e.g., extra material unintentionally added to a layer of a part) and void (e.g., material unintentionally absent from a layer of a part). At block 180, a CAD model of each layer of a part is used to generate a mask image, which contain an idealized representation of each layer. The mask image is white in all regions that contain part material and black in all other regions. However, the specific shade of color, used to represent a mask region, is arbitrary and can be changed as long as consistent convention is used throughout the process. At block 182, the mask image is spatially aligned with the scanned image of the corresponding layer. This can be accomplished through template matching, where the mask image is iteratively placed at each possible offset (e.g., x,y offset) relative to the scanned image 154 and the offset, which produced the greatest similarity between the scanned image 154 and the mask image, is chosen as the scan-mask alignment.

At block 184, adaptive thresholding of the scanned image is performed to segregate material on the current layer from material from previous layers, such that only material on the most-recently deposited layer, and any voids or inclusions therein, are shown in the scanned image. Issues with defect detection caused by part curvature, can be mitigated using the adaptive thresholding procedure. At block 186, the scanned image is filtered to eliminate surface texture created during the fabrication of the layer and which is not considered a defect. The fused-filament fabrication process inherently creates a part microstructure which is porous by nature, however, the detection of this diffuse porosity is undesirable as it does not indicate a defect in the layer. Accordingly, the diffuse porosity is filtered out to avoid confusion with actual defects in the scanned image. At block 188, after filtering to eliminate surface texture, the scanned image is compared to the mask image. Any defects meeting defect criteria are recorded and displayed to an operator. Information about the detected defect is generated and may include the type of defect (e.g., inclusion or void), area of defect, aspect ratio, and location of the defect. In some examples, the scanned image may have the defect, and any information about the defect, indicated (e.g., marked or otherwise shown) on the scanned image.

Figure 13:
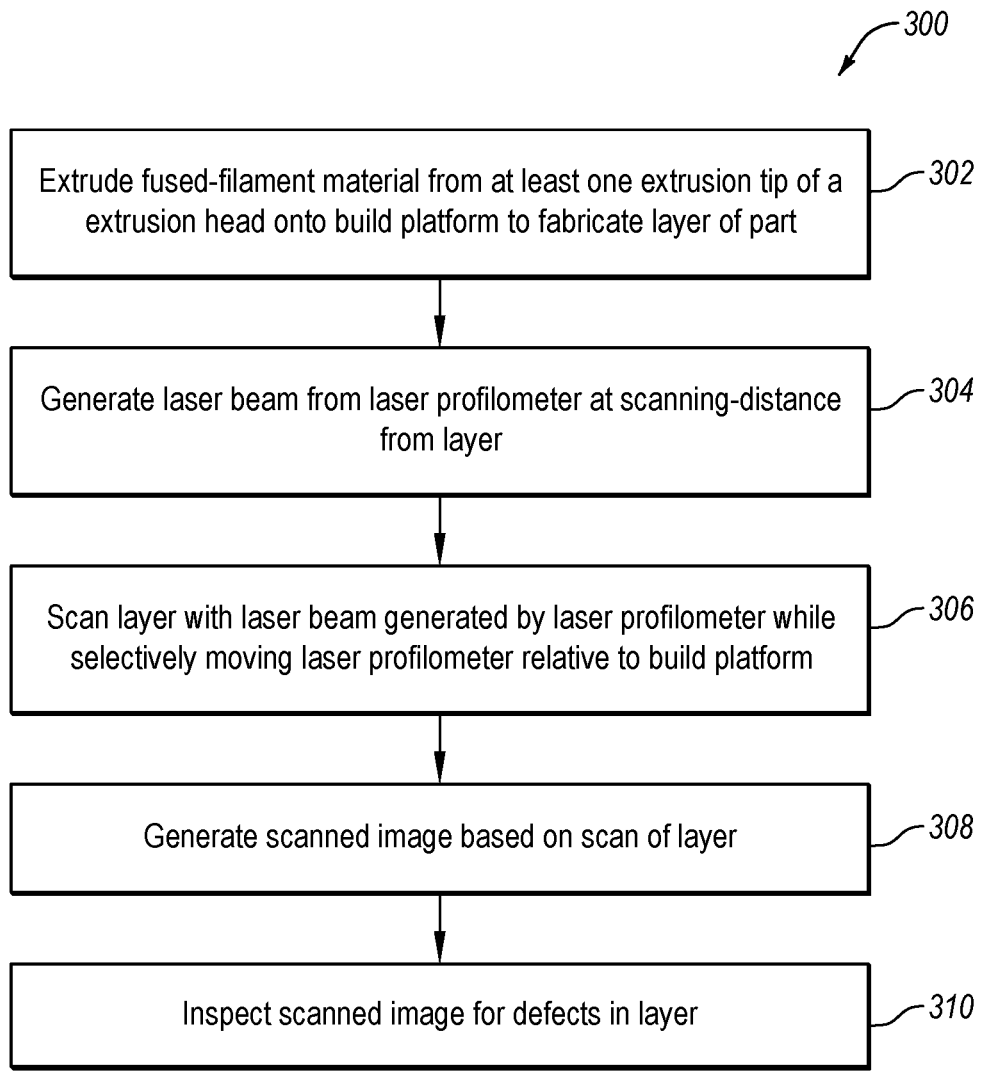
FIG. 13 is a schematic flow diagram of a method of in-process inspection of a part, according to one or more examples of the present disclosure.

Referring to FIG. 13, according to some examples, a method 300 for in-process inspection of a part 122 is shown. The method 300 includes (block 302) the step of extruding a fused-filament material from at least one extrusion tip 116 of an extrusion head 110 onto a building surface 126 of a build platform 124 to fabricate a layer 150 of a part 122, as shown in FIGS. 1 and 2. The extrusion head 110 is coupled with a support system 127, which in some examples is a build box 102, and selectively moved relative to the building surface 126 of the build platform 124 when extruding the fused-filament material and when the at least one extrusion tip 116 is a building-distance D from the building surface 126. During the fabrication of subsequent layers, the extrusion tip 116 is maintained at the building-distance D from the most recently fabricated layer, rather than the building surface 126.

The method 300 also includes (block 304) generating a laser beam 120 from a laser profilometer 118 at a scanning-distance D2 from the layer 150 of the part 122, the laser profilometer 118 coupled with the support system 127. The method 300 further includes (block 306) scanning the layer 150 of the part 122 with the laser beam 120 generated by the laser profilometer 118 while selectively moving the laser profilometer 118 relative to the building surface 126 of the build platform 124. Next, the method 300 includes (block 308) generating a scanned image 154 based on the scan of the layer 150 of the part 122. In some examples, the laser profilometer 118 is communicatively coupled with a controller and/or computer system that is capable of controlling the laser profilometer 118 and converting the scan data into the scanned image 154.

The method 300 further includes (block 310) inspecting the scanned image 154 for defects in the layer 150 of the part 122. The inspection may be performed manually by an operator analyzing the scanned image 154 and/or comparing the scanned image 154 to a representative model 170. Additionally, or alternatively, the inspection can be performed automatically, such as using the method of automatic defect detection of FIG. 12. In some examples, the scanned image 154 is inspected immediately after the layer 150 of the part 122 is deposited. In other words, the scanned image 154 generated by the scan of the layer 150 is inspected before a subsequent layer of the part 122 is deposited. Immediately inspecting the layer 150, allows an operator, in response to detecting a defect, to perform an in-process correction to the defect. Alternatively, if the defect cannot be corrected, the building of the part 122 can be terminated, reducing material waste and commensurate cost. In other examples, the scanned image 154 is inspected at some time after the layer 150 is deposited, such as before the part 122 is fully fabricated or after the part is fully fabricated.

The part 122 continues being built layer-by-layer, while scanning each layer or selected layers with the laser profilometer 118. The vertical location of the build platform 124 is adjusted, and alternates between the building-distance D during fabrication of a layer and the scanning-distance D2 during scanning of a layer.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent to another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the examples herein are to be embraced within their scope.

What is claimed is:

1. A system for in-process inspection of a fused-filament fabricated part, the system comprising:
   a build box, comprising an internal chamber and comprising an enclosure that encloses the internal chamber, wherein at least a portion of the enclosure comprises a window;
   an extrusion head, comprising a first portion, exterior to the build box, and a second portion, comprising at least one extrusion tip and extending through the enclosure of the build box and into the internal chamber of the build box; and
   a laser profilometer, coupled with the first portion of the extrusion head at a location adjacent to the window of the enclosure, wherein the laser profilometer is configured to project a laser beam through the window and into the internal chamber.

2. The system of claim 1, wherein:
   the enclosure comprises a top side;
   the second portion of the extrusion head extends through the top side of the enclosure; and
   the extrusion head is selectively movable relative to the internal chamber and in a plane parallel to the top side of the enclosure.

3. The system of claim 2, wherein:
   the extrusion head is selectively movable to move the laser profilometer such that the laser beam of the laser profilometer follows a raster scanning pattern when the laser beam is projected through the window and into the internal chamber; and
   the raster scanning pattern comprises a plurality of linear paths.

4. The system of claim 2, wherein:
   the top side of the enclosure of the build box comprises pleated-insulating elements configured to retract or expand when the extrusion head selectively moves relative to the top side of the enclosure of the build box;
   the second portion of the extrusion head extends through the pleated-insulating elements;
   the window is positioned laterally adjacent the second portion of the extrusion head;
   the second portion of the extrusion head and the window are surrounded by the pleated-insulating elements; and
   the window and the extrusion head are co-movable relative to the internal chamber.

5. The system of claim 2, further comprising a build platform within the internal chamber of the build box, wherein the build platform is selectively movable, relative to the internal chamber, in a direction perpendicular to the plane parallel to the top side of the enclosure.

6. The system of claim 1, further comprising a housing coupled with the laser profilometer, wherein the housing at least partially surrounds and is spaced apart from the laser profilometer such that air gaps are defined between the housing and the laser profilometer.

7. The system of claim 6, further comprising a cooling system coupled with the housing and configured to force air through the air gaps defined between the housing and the laser profilometer.

8. The system of claim 1, further comprising a shielding surrounding at least a portion of the build box and configured to shield the build box from ambient light when the laser profilometer is projecting the laser beam through the window and into the internal chamber.

9. A system for in-process inspection of a fused-filament fabricated part, the system comprising:
   a build platform, comprising a building surface;
   a support system vertically spaced apart from the build platform and selectively movable in a plane parallel to the build platform;
   an extrusion head, comprising a first portion and a second portion, wherein:
      the extrusion head is couplable to the support system; and
      the second portion comprises at least one extrusion tip; and
   a laser profilometer couplable to the first portion of the extrusion head when the extrusion head is coupled to the support system, wherein the laser profilometer is configured to project a laser beam in a direction towards the build platform when the laser profilometer is coupled to the support system.

10. The system of claim 9, further comprising a shielding, surrounding at least the build platform and the laser beam projected by the laser profilometer when the laser profilometer projects the laser beam in the direction towards the build platform, wherein the shielding is configured to shield the build platform and the laser beam from ambient light.

11. A system for in-process inspection of a fused-filament fabricated part, the system comprising:
a build platform, comprising a building surface;
a support system vertically spaced apart from the build platform and selectively movable in a plane parallel to the build platform;
an extrusion head, comprising a first portion and a second portion, wherein:
the extrusion head is couplable to the support system; and
the second portion comprises at least one extrusion tip; and
a laser profilometer directly couplable to the support system separately from the extrusion head such that when the laser profilometer is coupled to the support system the extrusion head is not coupled to the support system, wherein the laser profilometer is configured to project a laser beam in a direction towards the build platform when the laser profilometer is coupled to the support system.

12. The system of claim 11, further comprising a shielding, surrounding at least the build platform and the laser beam projected by the laser profilometer when the laser profilometer projects the laser beam in the direction towards the build platform, wherein the shielding is configured to shield the build platform and the laser beam from ambient light.

13. A method of in-process inspecting a part, the method comprising steps of:
extruding a fused-filament material from at least one extrusion tip of a extrusion head onto a building surface of a build platform to fabricate a layer of a part, wherein:
the extrusion head is coupled with a support system; and
the extrusion head is selectively moved in a plane parallel to the building surface of the build platform when extruding the fused-filament material and when the at least one extrusion tip is a building-distance from the building surface;
generating a laser beam from a laser profilometer at a scanning-distance from the layer of the part, the laser profilometer coupled with the support system;
scanning the layer of the part with the laser beam generated by the laser profilometer while selectively moving the laser profilometer relative to the building surface of the build platform;
generating a scanned image based on the scan of the layer of the part; and
inspecting the scanned image for defects in the layer of the part.

14. The method of claim 13, further comprising steps of:
moving the build platform in a direction perpendicular to the building surface, such that the at least one extrusion tip of the extrusion head is the building-distance from the layer of the part;
extruding the fused-filament material from the at least one extrusion tip of the extrusion head onto the layer of the part to fabricate a second layer of the part, when the extrusion head is selectively moved relative to the building surface of the build platform;
generating the laser beam from the laser profilometer at the scanning-distance from the second layer of the part;
scanning the second layer of the part with the laser beam generated by the laser profilometer while selectively moving the laser profilometer relative to the building surface of the build platform;
generating a second scanned image based on the scan of the second layer of the part; and
inspecting the second scanned image for defects in the second layer of the part.

15. The method of claim 14, further comprising:
generating a three-dimensional image of the part using at least the scanned image and the second scanned image; and
inspecting the three-dimensional image of the part for defects in the layer and the second layer of the part.

16. The method of claim 13, further comprising a step of performing in-process corrections to defects in the layer of the part in response to inspecting the scanned image for defects in the layer of the part.

17. The method of claim 13, wherein:
the step of scanning the layer of the part with the laser beam comprises scanning the layer of the part by moving the laser beam in a raster scanning pattern comprising a plurality of linear paths, wherein each one of the plurality of linear paths at least partially overlaps an adjacent one of the plurality of linear paths; and
the step of generating the scanned image comprises generating an individual scanned image for each one of the plurality of linear paths and processing the individual scanned images to generate a processed image of the layer of the part.

18. The method of claim 13, wherein the step of generating a scanned image based on the scan of the layer further comprises performing skew correction on the scanned image to eliminate image distortion resulting from angular misalignment of the laser profilometer relative to the build platform.

19. The method of claim 13, wherein the step of inspecting the scanned image for defects in the layer of the part comprises comparing the scanned image to a representative model of the layer that is free of defects to detect differences between the scanned image and the representative model.

20. The method of claim 13, wherein:
the build platform is located within an internal chamber enclosed by an enclosure of a build box;
the support system is located at a top side of the enclosure;
the extrusion head comprises a first portion, exterior to the build box, and a second portion, comprising the at least one extrusion tip and extending through the enclosure of the build box and into the internal chamber of the build box;
the laser profilometer is coupled with the first portion of the extrusion head and adjacent to a window of the enclosure, wherein the laser profilometer projects the laser beam through the window when scanning the layer of the part; and
the internal chamber is heated when the layer of the part is fabricated on the building surface of the build platform.

\* \* \* \* \*